B. F. GRIMES.
Corn-Planter.

Patented May 28, 1867.

WITNESSES:
Chas. D. Smith
J. E. M. Bowen

INVENTOR:
B. F. Grimes
By Knight Bros.
Attorneys.

2 Sheets—Sheet 2.
B. F. GRIMES.
Corn-Planter.
No. 65,073. Patented May 28, 1867.
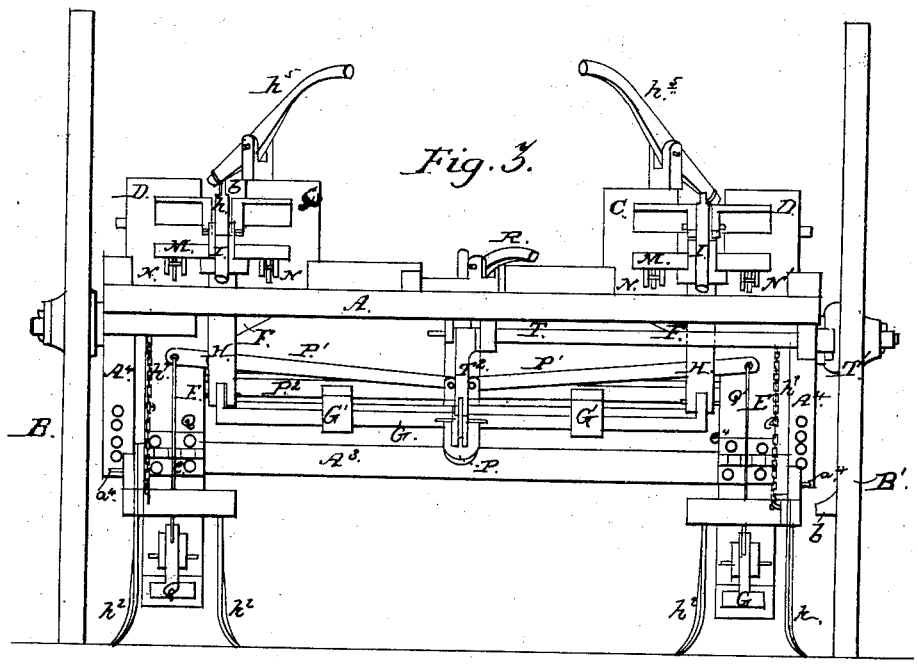
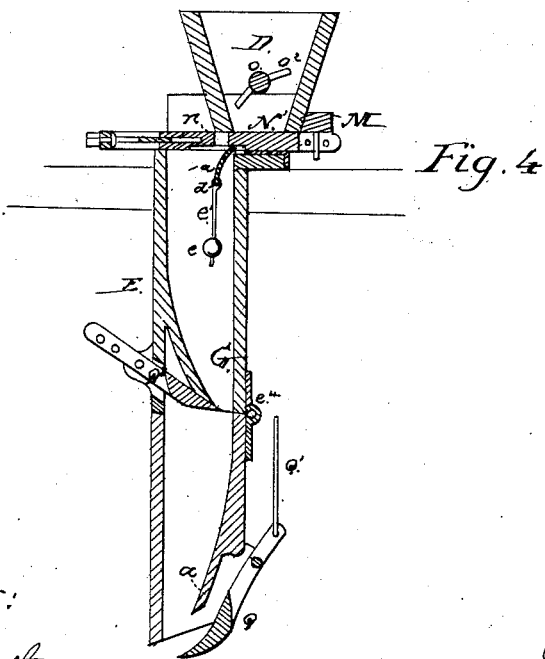
WITNESSES:
Chas. D. Smith
J. E. McBowen
INVENTOR:
B. F. Grimes
By Knight Bros
Attorneys

United States Patent Office.

BENJAMIN F. GRIMES, OF DAWSONSVILLE, MARYLAND.

*Letters Patent No. 65,073, dated May 28, 1867.*

CORN-PLANTER AND FERTILIZER COMBINED.

*The Schedule referred to in these Letters Patent and making part of the same.*

TO ALL WHOM IT MAY CONCERN:

Be it known that I, BENJAMIN F. GRIMES, of Dawsonsville, in the county of Montgomery, and State of Maryland, have invented certain new and useful improvements in Corn-Planters and Fertilizers combined; and I do hereby declare the following to be a full, clear, and exact description of the same, reference being had to the accompanying drawings, which are made a part of this specification, and in which—

Figure 3 is a rear end elevation.

Figure 4 is a section on the line $y\ y$, fig. 1.

Similar letters of reference indicate corresponding parts in the several figures.

Figure 1:
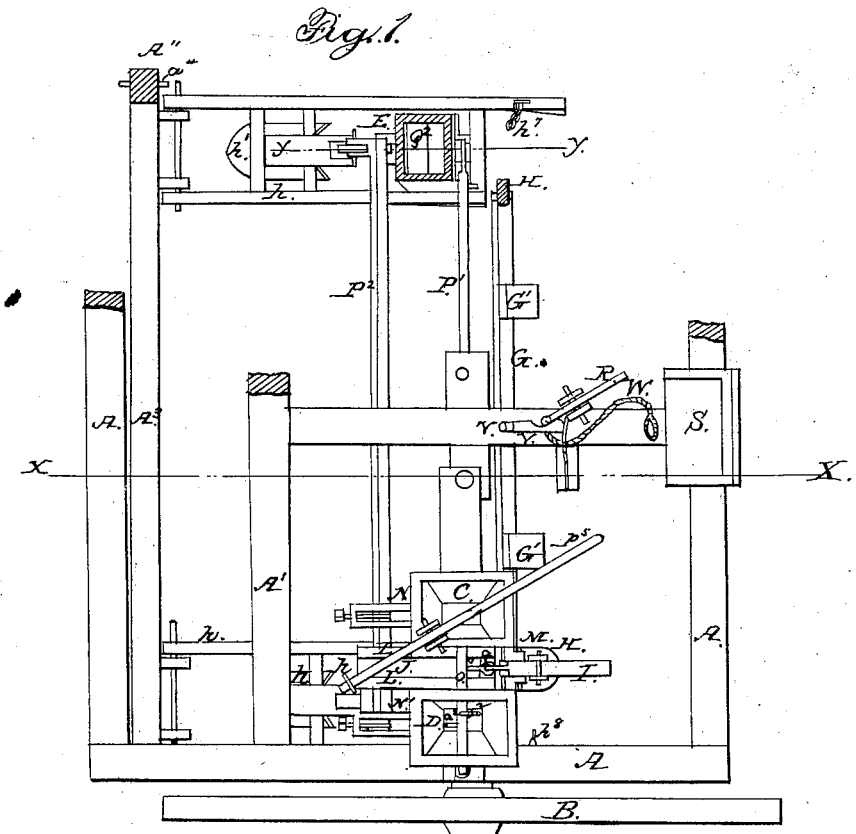
Figure 1 is a plan of my improved machine, partly in section.
Figure 2:
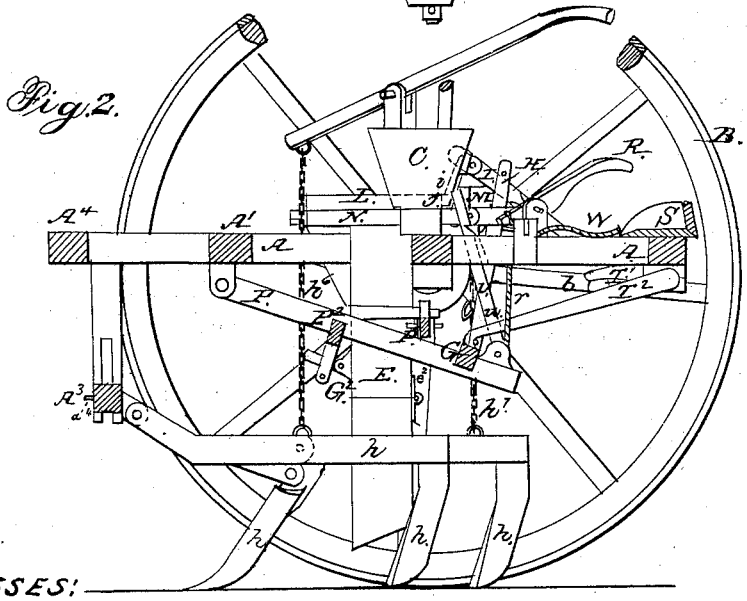
Figure 2 is a vertical section of the same, in the plane indicated by the line $x\ x$, fig. 1.

This machine is intended to plant two rows of corn at a time, and to deposit a fertilizing phosphate or material simultaneously with each discharge of grain.

The invention consists, first, in a novel method of arranging the corn and fertilizer-hoppers upon the carriage, whereby I obtain simplicity and compactness of construction, as well as uniformity and regularity in operation. It consists also in a novel method of constructing and arranging the dropping mechanism, which is such that the motion may be derived from one of the ground-wheels, and the action regulated by a spring in such a manner that the corn may be accurately dropped in check-rows, to subsequently enable the cultivator to traverse the field both ways; or the motion may be derived from the hand of an attendant riding upon the carriage. In either case the dropping mechanism is entirely under the control of the attendant, who permits the dropping to occur only at appropriate intervals. It further consists in a novel method of constructing and applying the hinged frames which carry the furrow-opening shovels and coverers, the latter being adapted for vertical adjustment, to vary the depth of penetration. The invention consists also in constructing the discharge-tubes in sections, which are hinged together so that the lower portion may be turned up when not in use, and thus avoid contact with the ground or obstructions thereon; and, finally, it consists in a novel arrangement of valves within the discharge-tubes, together with deflectors to give direction to the course of the grain and fertilizing material in its descent, in order to prevent the clogging of the valves.

In order that others skilled in the art to which my invention appertains may be enabled to fully understand and use the same, I will proceed to describe it in detail.

In the accompanying drawings, A represents the main frame, which is supported upon the ground-wheels B $B^1$, and upon which the several operating parts of the machine are mounted. C C D D represent four hoppers, two of which are located at each side of the frame, in proximity with the carrying-wheels, as represented. The outer hoppers D D contain the fertilizing material, while the inner ones C C contain the corn. E E represent the discharge-tubes, which respectively occupy positions directly beneath the fertilizer-hoppers D D. F F are inclined spouts or ducts leading from the corn-hoppers C C to the discharge-tubes E E. The object in thus arranging the hoppers in relation to the discharge-tubes is twofold, to wit: first, the fertilizing material has a free and direct passage from its hopper to the tube E, which conducts it to the ground, it being not so well adapted to pass over the inclined surface of the connecting-spout F; secondly, the spouts F F, being inside of the discharge-tubes E E, precludes the necessity of widening the frame for their accommodation. G represents a transverse bar, which is situated somewhat behind and below the axis of the carrying-wheels, and which may be provided with weights $G^1\ G^1$. To the opposite extremities of this bar are hinged two arms, H H, the upper extremities of which are suitably connected with levers I I. Each of these levers I has rigidly joined to its forward end a finger or projection, $i$, which engages with a notch, $j$, in a dove-tailed slide, J, which reciprocates horizontally in a corresponding guide-way, L, between the hoppers C D. M is a bar attached at right angles to the slide J, and connected at its opposite ends with the dropping slides N $N^1$ of the hoppers C D, respectively. The forward extremities of the two levers I I are connected by links $o$ and lugs $o^1$ with the shafts O, which are armed with radial teeth or projections, $o^2$, to agitate the fertilizing material in the outer hoppers D D. P is a bar fastened to the centre of the bar G, and jointed or hinged at its forward end to the transverse beam $A^1$ of the main frame A. $P^1\ P^1$ are levers, the inner ends of which are attached to the bar P, while their outer ends are attached to rods $Q'\ Q'$, which actuate the valves Q Q, pivoted within the lower ends of the discharge-tubes E E. P² is a transverse bar also attached to the bar P, and extending from said bar toward the opposite sides of the machine, it having slotted arms upon its opposite slides for the attachment of the valves Q² Q², which are also arranged within the discharge-tubes E E, but at some distance above the valves Q Q. The upward motion of the transverse bar G has the effect, through the connections above described, to move the slides N N¹ into position to fill their receiving pockets or apertures from their respective hoppers, and to simultaneously open the upper valves Q² Q² and close lower valves Q Q. The descent or downward motion of bar G actuates the seed-slides N N¹, so as to empty the contents of their pockets into the discharge-tubes E E F F, and simultaneously closes the upper valves Q² Q² and opens the lower valves Q Q. In operation every downward motion of the bar G causes the hoppers to yield a determined quantity of grain and fertilizing material to the discharge-spouts E, wherein it is intercepted in its downward passage by the closing of the valves Q² Q², and at the same time the lower valves Q Q are made to open and deposit on the ground the grain and fertilizing substance which had previously fallen down upon them from the valves Q². At every upward motion of bar G the effect is reversed, i. e., the receiving pockets are thrown into the hoppers, the upper valves are opened, and the lower valves are closed ready to receive the grain, &c., and retain it for the next dropping.

The above may suffice for the operation of the parts which are immediately concerned in dropping, and I shall now proceed to describe the means for imparting motion to the bar G, from which the motion of the operating or dropping mechanism is derived.

R represents a lever connected to the forward end of bar P, through the medium of the cord or other suitable connection $r$. An attendant sitting upon the seat S, may readily elevate the bar G by depressing the rear end of lever R, and, by holding down the lever, can postpone the moment of discharge so as to make the deposit exactly in the checks or desired points of delivery. As this means of raising the bar involves the constant use of the hands, it may be desirable to raise the same mechanically, and I have therefore applied to the machine a rock-shaft, T, the outer arm T¹ of which has its extremity raised by the action of a tappet, $b$, which may be fastened to one of the spokes of the wheel B¹ by a set-screw or otherwise. When the tappet $b$ strikes the arm T¹, the rock-shaft T undergoes a partial rotation, and the arm T² on the inner end of the rock-shaft is thrown upward. The forward extremity of the arm T² is forked, and made to embrace the flattened end of a vertical post, U, which is jointed at its lower end to the rear end of bar P, and said post is guided in its vertical movement in an aperture in the frame A. Shoulders $u$, found on the post U, near its lower end, engage with the forked end of arm T², so that when the latter is thrown upward by the wheel, the post U and bar G rise with it. A notch is formed in the post U, and when it rises to a certain extent a spring-catch, V, takes into the notch and retains the post as well as the bar G in its elevated position. Before the bar G can fall, and hence before the seed can be dropped, the spring-catch F must be retracted by means of the cord W, in the hand of the attendant. Whether raised by the means above described, or by hand, as hereinbefore alluded to, the bar G will, when released, be caused to descend with a positive and quick motion by the weights G¹ G¹, and a corresponding impulse is thereby imparted to the seed-dropping mechanism. In each of the discharge-tubes E are two deflecting pieces or plates, $a$, which cause the descending grain and fertilizing material to fall more towards the free sides of the valves, thus preventing their joints from becoming clogged and impaired in operation. The slides N in the fertilizer-hoppers D, are liable to become clogged by the phosphate or other fertilizing material, which has a tendency to work its way between the slide and the surface upon which it moves, where its presence would seriously retard the motion of the slide on account of its tenacious or gummy character. To obviate this difficulty I propose to employ a leather flap-valve, $d$, fig. 4, which is attached at the under side of the cell or pocket $n$ in each of the fertilizer slides, and which has a ball, $e$, attached to it by means of a rod or cord, $e^1$. As the cell $e$ enters the hopper, the flap $d$ closes snugly against the under side of the slide, and prevents the phosphate from getting between the surfaces; and as the slide moves so as to carry the cell out of the hopper, the flap falls or opens, and the ball $e$ strikes against the inside of the tube E, and thereby dislodges any material which may have a tendency to stick. Each of the discharge tubes E is formed in two parts, which are hinged together at $e^1$, so that when the machine is not in operation, the lower portion of the tube may be turned up and hooked to the frame in any convenient manner, for the purpose of avoiding contact with the ground or obstacles thereon. The lower portion of the tube E may be braced, when in its operating position, by a hook and staple, or otherwise. $h\ h$ represent two frames, the side-pieces of which occupy positions at the opposite sides of the respective discharge-tubes E. These frames are hinged to a transverse bar, A³, which is adjustable in the slotted pendants A⁴ A⁴, by means of movable pins $a^4$. A shovel or furrow-opener, $h^1$, has its shank attached to and braced in each of the frames $h$, as represented, and while the shovel moves forward in advance of the corresponding discharge-tube E, the curved covering-blades $h^2\ h^2$, attached to the rear of said frame $h$, follow the tube E, and throw the earth inward and over the corn and fertilizing material, as soon as it falls into the furrow. The frames $h\ h$ may be raised independently by means of the levers $h^5\ h^5$ and cords $h^6\ h^6$, which levers are within convenient reach of the attendant upon the seat S, and which are brought into requisition in turning the machine at the end of rows, and also to raise frames $h$, when the lower ends of the discharge-tubes are turned up as above described. The frames $h$ may be held in an elevated position, by means of the cords $h^7$, which are hitched to the pins $h^8$ on the main frame. The frames $h\ h$ are raised preparatory to turning up the hinged section of the discharge-tube. When the lower ends of the discharge-tubes are to be raised, the valve-rods $a^1$ are detached.

Having thus described my invention, what I claim as new herein, and desire to secure by Letters Patent, is—

1. The arrangement of the corn-hoppers C C, fertilizer-hoppers D D, discharge-tubes E E, and inclined tubes F F, substantially as and for the purpose herein set forth.

2. The combination of the bar G, hinged arms H H, levers I I, slides J J, and dropping slides N N N¹ N¹, substantially as herein described.

3. The combination of the bar P, levers $P^1$ $P^1$, rods $Q^1$ $Q^1$, bar $P^2$, and valves Q Q $Q^2$ $Q^2$, all arranged and operating substantially as herein described.

4. The combination with the bar G, and its described connections with the dropping mechanism, of the lever R, arranged and employed in the manner and for the purpose explained.

5. The combination of the rock-shaft T, arms $T^1$ $T^2$, tappet or projection $b$, notch-post U, and spring-catch V, arranged and operating in connection with the dropping mechanism as and for the purpose specified.

6. The stirring-shafts O O $o^2$, in combination with the levers I I, links $o$ $o$, and lugs $o^1$ $o^1$, as described.

7. The discharge-tube E, when made in two or more parts, and hinged in order to adapt the lower section to be turned up and held in its raised position, substantially as described.

8. The arrangement within the discharge-tubes of the deflecting pieces or plates $a$, substantially as and for the purpose set forth.

9. The weights $G^1$ $G^1$, in combination with the bar G, as and for the purpose explained.

10. The frames $h$ $h$, carring the shovels $h^1$ and coverers $h^2$ $h^2$, in combination with the supporting bar A, slotted pendants $A^4$ $A^4$, and adjusting pins $a^4$, all arranged and operating in the manner and for the purpose explained.

11. The combination, with the dropping slide of the fertilizer-hopper D, of the flap-valve $d$, and ball or weight $e$, applied and operating in the manner and for the purpose specified.

BENJAMIN F. GRIMES.

Witnesses:
 CHAS. D. SMITH,
 JAMES L. EWIN.